(12) United States Patent
Takizawa

(10) Patent No.: US 9,085,325 B2
(45) Date of Patent: Jul. 21, 2015

(54) VEHICLE BODY SIDE STRUCTURE

(71) Applicant: HONDA MOTOR CO., LTD., Tokyo (JP)

(72) Inventor: Satoshi Takizawa, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 6 days.

(21) Appl. No.: 14/053,677

(22) Filed: Oct. 15, 2013

(65) Prior Publication Data

US 2014/0145468 A1    May 29, 2014

(30) Foreign Application Priority Data

Nov. 27, 2012  (JP) ................................. 2012-258569

(51) Int. Cl.
*B62D 25/04* (2006.01)
*B62D 21/15* (2006.01)
*B62D 25/20* (2006.01)

(52) U.S. Cl.
CPC .............. *B62D 25/04* (2013.01); *B62D 21/157* (2013.01); *B62D 25/2036* (2013.01)

(58) Field of Classification Search
CPC ....................................................... B62D 25/04
USPC ............. 296/187.12, 187.11, 187.03, 193.06, 296/188
See application file for complete search history.

(56) References Cited

U.S. PATENT DOCUMENTS 6,312,045 B2 * 11/2001 Kitagawa ................. 296/187.12
6,447,052 B2 *  9/2002 Saeki ....................... 296/187.09

FOREIGN PATENT DOCUMENTS

JP    2000-302058 A    10/2000
JP    2010-188983 A     9/2010

* cited by examiner

*Primary Examiner* — Joseph D Pape
*Assistant Examiner* — Dana Ivey
(74) *Attorney, Agent, or Firm* — Westerman, Hattori, Daniels & Adrain, LLP

(57) ABSTRACT

In a vehicle body side structure, a first fragile portion that induces bending deformation toward the inside of a vehicle cabin when a load is input from the front and a second fragile portion that induces bending deformation toward an area outside the vehicle cabin when a load is input from the front are formed in an inclined region of a front pillar extending diagonally rearward and upward from a front end portion of the front pillar toward a roof side rail. The first fragile portion is positioned in front of the second fragile portion.

8 Claims, 10 Drawing Sheets

VEHICLE BODY SIDE STRUCTURE

CROSS REFERENCES TO RELATED APPLICATIONS

The present application claims priority under 35 U.S.C. §119 to Japanese Patent Application No. 2012-258569, filed Nov. 27, 2012, entitled "Vehicle Body Side Structure." The contents of this application are incorporated herein by reference in their entirety.

TECHNICAL FIELD

The present disclosure relates to a vehicle body side structure.

BACKGROUND

Front pillars that are to be disposed on the sides of a front portion of a vehicle cabin each have a closed cross section structure extending over substantially the entire area of the front pillar in a longitudinal direction, and this enables each of the front pillars to obtain a sufficient rigidity for a load that is input from the outside. However, in the case where a large impact load is input from the outside, it is impossible to completely eliminate deformation of such front pillars. Therefore, a vehicle body side structure capable of suppressing entry of deformed front pillars into a vehicle cabin by controlling the deformation behavior of each portion of the front pillars has been proposed (see, for example, Japanese Unexamined Patent Application Publication Nos. 2000-302058 and 2010-188983).

In the vehicle body side structure described in Japanese Unexamined Patent Application Publication No. 2000-302058, an inclined region of each of front pillars extending diagonally rearward and upward from a front end portion of each of the front pillars toward a corresponding one of roof side rails has a closed cross section structure, and a reinforcing member that is to be disposed in the closed cross section of each of the inclined regions includes a front reinforcing member and a rear reinforcing member. In an area outside a vehicle cabin, the front reinforcing member and the rear reinforcing member are superposed with each other in such a manner as to form a high-strength portion, and in an area inside the vehicle cabin, the front reinforcing member and the rear reinforcing member are separated from each other in such a manner as to form a fragile portion.

In the case of the above vehicle body side structure, when a large impact load is input from a front portion or side portions of a vehicle body, the inclined region of each of the front pillars is bent and deformed toward an area outside the vehicle cabin with the corresponding fragile portion acting as a bending center.

However, in the vehicle body side structure described in Japanese Unexamined Patent Application Publication No. 2000-302058, for example, in the case where a large impact load is input to a front region of one of the front pillars from diagonally from the front with respect to the lateral direction of the vehicle body, a situation may be assumed in which the inclined region of the front pillar is bent and deformed toward the area outside the vehicle cabin with the corresponding fragile portion acting as a center, and in which a moment oriented toward the inside of the vehicle cabin acts in a region extending from the front pillar to the corresponding roof side rail. Therefore, in the vehicle body side structure described in Japanese Unexamined Patent Application Publication No. 2000-302058, an additional reinforcement is required in order to prevent the roof side rails from entering the inside of the vehicle cabin to a large extent.

SUMMARY

In one aspect, the present application describes a vehicle body side structure capable of preventing component members from entering in a direction of the inside of a vehicle cabin to a large extent when a large impact load is input from the outside without a significant reinforcement.

The vehicle body side structure according to one aspect employs the following configuration in order to solve the above problem. In the following explanation of the exemplary embodiment, specific elements with their reference numerals are indicated by using brackets. These specific elements are presented as mere examples in order to facilitate understanding, and thus, should not be interpreted as limiting the accompanying claims.

The vehicle body side structure according to one aspect of the exemplary embodiment includes an inward-deformation-inducing portion (e.g., a first fragile portion 13 in embodiments) that induces bending deformation toward the inside of a vehicle cabin when a load is input from the front and an outward-deformation-inducing portion (e.g., a second fragile portion 14 in the embodiments) that induces bending deformation toward an area outside the vehicle cabin when a load is input from the front in an inclined region (e.g., an inclined region 6A in the embodiments) of a front pillar (e.g., a front pillar 6 in the embodiments) extending diagonally rearward and upward from a front end portion of the front pillar toward a roof side rail (e.g., a roof side rail 5 in the embodiments), and the inward-deformation-inducing portion is positioned in front of the outward-deformation-inducing portion.

With this configuration, when a large impact load is input from a front portion of the front pillar, bending deformation toward the inside of the vehicle cabin occurs in a front portion of the inclined region of the front pillar with the inward-deformation-inducing portion acting as a starting point, and bending deformation toward an area outside the vehicle cabin occurs in a portion of the inclined region of the front pillar behind the inward-deformation-inducing portion with the outward-deformation-inducing portion acting as a starting point. In this case, since a portion of the front pillar in the vicinity of the inward-deformation-inducing portion in which bending deformation toward the inside of the vehicle cabin occurs is positioned in front of the outward-deformation-inducing portion, the portion of the front pillar will not be displaced into a region in the vicinity of front seats. The inclined region of the front pillar is bent at two positions that are the inward-deformation-inducing portion and the outward-deformation-inducing portion acting as starting points, and a large load is not likely to be transferred onto a portion of the inclined region behind the outward-deformation-inducing portion. Therefore, even if a large impact load is diagonally input from the front with respect to the lateral direction of a vehicle body to the front portion of the front pillar, a rear portion of the front pillar and the roof side rail are not likely to enter in a direction of the inside of the vehicle cabin.

In another aspect, the roof side rail may be formed in such a manner as to be continuous with the rear portion of the front pillar, a region extending at least from the outward-deformation-inducing portion of the front pillar to a joint portion of the roof side rail to which a center pillar (e.g., a center pillar 9 in the embodiments) is joined may have a structure in which a reinforcing member (e.g., an inner panel 10a in the embodiments) is disposed in a closed cross section that is formed by an outer panel (e.g., an outer panel 12 in the embodiments)

and an inner panel (e.g., an inner panel 10a in the embodiments), and a side-curtain air bag system (e.g., a side-curtain air bag system 15 in the embodiments) may be disposed in the region.

With this configuration, the rigidity of the region extending from the outward-deformation-inducing portion of the front pillar to the joint portion of the roof side rail to which the center pillar is joined may be enhanced by the reinforcing member, occurrence of deformation in the region may be suppressed when a large impact load is input from the front portion of the front pillar along the inclined region, and a space large enough for the side-curtain air bag system to expand may be secured.

In another aspect, in the front pillar, the inner panel (e.g., the inner panel 10a in the embodiments) facing the inside of the vehicle cabin and a reinforcing member (e.g., a lower stiffener 11b in the embodiments) facing the area outside the vehicle cabin may be joined to each other, so that a closed cross section that functions as a frame of the vehicle body may be formed, and the inward-deformation-inducing portion may be formed by forming a fragile portion (e.g., the first fragile portion 13 in the embodiments) in an upper ridge line that is one of two ridge lines (e.g., an upper ridge line ru and a lower ridge line rl in the embodiments) that are formed on the upper and lower sides in the reinforcing member facing the area outside the vehicle cabin and that extend in a longitudinal direction of the front pillar.

With this configuration, when a large impact load is input to the front portion of the front pillar along a direction in which the inclined region of the front pillar extends, the fragile portion formed in the upper ridge line of the reinforcing member of the front pillar facing the area outside the vehicle cabin is bent and deformed toward the inside of the vehicle cabin.

In another aspect, in the front pillar, the inner panel (e.g., the inner panel 10a in the embodiments) facing the inside of the vehicle cabin and a reinforcing member (e.g., an upper stiffener 11a in the embodiments) facing the area outside the vehicle cabin may be joined to each other, so that a closed cross section that functions as a frame of the vehicle body may be formed, and the outward-deformation-inducing portion may be formed by forming a fragile portion (e.g., the second fragile portion 14 in the embodiments) in a lower ridge line that is one of two ridge lines (e.g., an upper ridge line ru and a lower ridge line rl in the embodiments) that are formed on the upper and lower sides in the inner panel facing the inside of the vehicle cabin and that extend in the longitudinal direction of the front pillar.

With this configuration, when a large impact load is input to the front portion of the front pillar along the direction in which the inclined region of the front pillar extends, the fragile portion formed in the lower ridge line of the inner panel of the front pillar facing the inside of the vehicle cabin is bent and deformed toward the area outside the vehicle cabin.

In another aspect, the front pillar may include a downwardly extending region (e.g., a downward extending region 6B in the embodiments) extending downward from a front end portion of the inclined region. A diagonal frame (e.g., a diagonal frame 17 in the embodiments) that diagonally extends from the inside with respect to a vehicle width direction toward the front of a side portion of the vehicle body and that couples a frame member (e.g., a tunnel frame 16 in the embodiments) disposed in the inside with respect to the vehicle width direction and the side sill together may be coupled to the front portion of the side sill (e.g., the side sill 8 in the embodiments) extending in a front-rear direction of the vehicle body in a lower portion of the side portion of the vehicle body. A lower end of the downwardly extending region of the front pillar may be coupled to a front end portion of the side sill. Fragile portions (e.g., a fragile portion 8a and a fragile portion 17a in the embodiments) in each of which buckling is likely to occur when a load is diagonally input from the front of the side portion of the vehicle body may be formed in the front end portion of the side sill and a front end portion of the diagonal frame.

With this configuration, when an impact load is input from the front portion of the front pillar, buckling occurs in the fragile portions in the front end portions of the side sill and the diagonal frame, and the downward extending region of the front pillar is likely to be displaced rearward without the inclination angle of the downward extending region changing. Therefore, a component of force of the above impact load that acts on the inclined region of the front pillar along the extending direction of the inclined region may be increased by applying the structure to a vehicle in which an inclined region of a front pillar has a sharp rising curve. As a result, the inclined region may be made to deform with certainty with the inward-deformation-inducing portion and the outward-deformation-inducing portion acting as starting points.

In another aspect, the front pillar may include the downwardly extending region (e.g., the downward extending region 6B in the embodiments) extending downward from the front end portion of the inclined region. The diagonal frame (e.g., the diagonal frame 17 in the embodiments) that diagonally extends from the inside with respect to the vehicle width direction toward the front of the side portion of the vehicle body and that couples the frame member (e.g., the tunnel frame 16 in the embodiments) disposed in the inside with respect to the vehicle width direction and the side sill together may be coupled to the front end portion of the side sill (e.g., the side sill 8 in the embodiments) extending in the front-rear direction of the vehicle body in the lower portion of the side portion of the vehicle body. The lower end of the downwardly extending region of the front pillar may be coupled to the front end portion of the side sill. A fragile portion in which buckling is likely to occur when a load is diagonally input from the front of the side portion of the vehicle body may be formed in a portion of the side sill behind the center (e.g., the center c in the embodiments) of a coupling portion of the side sill to which the downwardly extending region is coupled in the front-rear direction.

With this configuration, when an impact load is input from the front portion of the front pillar, buckling occurs in the fragile portion behind the center of the coupling portion of the side sill to which the downwardly extending region of the front pillar is coupled in the front-rear direction, and the downwardly extending region of the front pillar is likely to be displaced in such a manner as to lean rearward. Therefore, a component of force of the above impact load that acts on the inclined region of the front pillar along the extending direction of the inclined region may be increased by applying the structure to a vehicle in which an inclined region of a front pillar has a gentle rising curve. As a result, the inclined region may be made to deform with certainty with the inward-deformation-inducing portion and the outward-deformation-inducing portion acting as starting points.

In another aspect, the front pillar may include the downwardly extending region (e.g., the downward extending region 6B in the embodiments) extending downward from the front end portion of the inclined region. The side sill (e.g., the side sill 8 in the embodiments) extending in the front-rear direction of the vehicle body in the lower portion of the side portion of the vehicle body may have a structure in which a reinforcing member (e.g., a stiffener 19 in the embodiments) that reduces bending deformation to a minimum is disposed in a closed cross section that is formed by the outer panel (e.g., the outer panel 12 in the embodiments) and an inner panel (e.g., an inner panel 18 in the embodiments). The diagonal frame (e.g., the diagonal frame 17 in the embodiments) that diagonally extends from the inside with respect to the vehicle width direction toward the front of the side portion of the vehicle body and that couples the frame member disposed in the inside with respect to the vehicle width direction and the side sill together may be coupled to the front portion of the side sill. A partition wall member (e.g., a bulk head 120 in the embodiments) that reinforces the cross section may be disposed within the side sill at a position below and in the vicinity of the coupling portion of the side sill to which the downwardly extending region of the front pillar is coupled.

With this configuration, occurrence of excessive bending deformation of the side sill may be suppressed by the diagonal frame, the reinforcing member within the closed cross section, and the partition wall member. As a result, when an impact load is input from the front portion of the front pillar, a component of force is likely to act in a direction along the inclined region of the front pillar.

According to an embodiment, in an inclined region of a front pillar, an inward-deformation-inducing portion is positioned in front of an outward-deformation-inducing portion, so that when a large impact load is input to a front portion of the front pillar, a bent portion may be prevented from being displaced into a region in the vicinity of front seats. In addition, since the inclined region of the front pillar is bent and deformed at two positions that are the inward-deformation-inducing portion and the outward-deformation-inducing portion acting as starting points when a large impact load is input, significant entry of a rear portion of the front pillar and a roof side rail in a direction toward the inside of a vehicle cabin may be prevented from occurring without providing a significant reinforcement to the front pillar and the roof side rail.

BRIEF DESCRIPTION OF THE DRAWINGS

The advantages of the disclosure will become apparent in the following description taken in conjunction with the following drawings.

DETAILED DESCRIPTION

Figure 1:
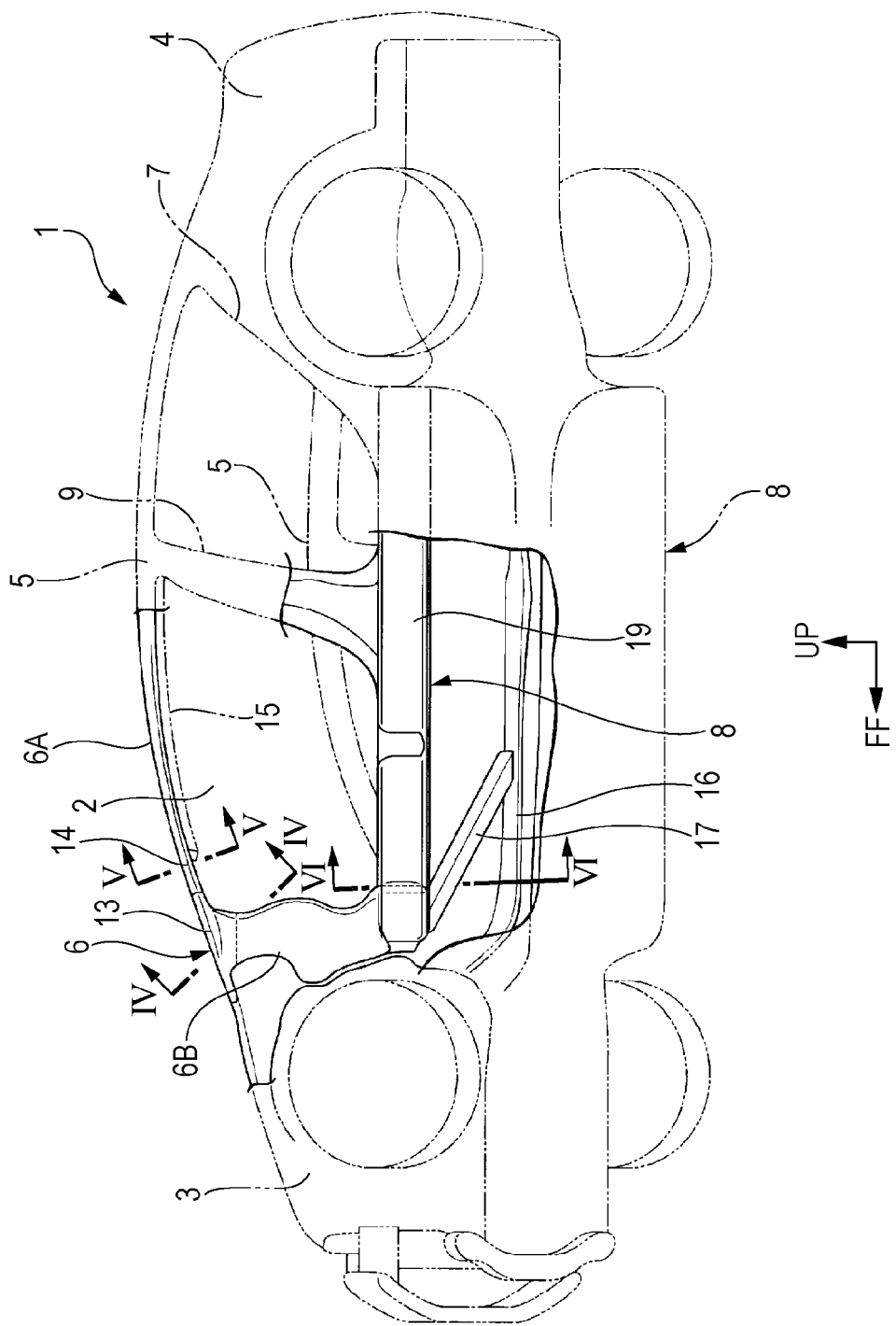
FIG. 1 is a side perspective view of a vehicle that employs a vehicle body side structure according to a first embodiment of the present disclosure as viewed from below.

Embodiments of the present disclosure will be described below with reference to the drawings. Note that, in the drawings, arrow FF points the front of a vehicle 1, and arrow UP points above the vehicle 1. In addition, in the following description, the terms "top", "bottom", "front", and "rear" refer to the top, bottom, front, and rear with respect to the vehicle 1, respectively, unless otherwise stated.

FIG. 1 is a diagram illustrating a frame portion of the vehicle 1 according to a first embodiment. The vehicle 1 according to the first embodiment is a sedan-type vehicle. An engine compartment 3 and a trunk compartment 4 are respectively formed in front of and to the rear of a vehicle cabin 2, and a space for front seats and a space for rear seats are secured in the vehicle cabin 2.

A roof side rail 5 that extends in the front-rear direction of a vehicle body and that has a closed cross section structure is disposed on the left and right sides of a roof portion of the vehicle 1. A front pillar 6 facing a front door opening and a rear pillar 7 facing a rear door opening are respectively disposed in front of and to the rear of each of the left and right roof side rails 5 in such a manner as to continuous with the corresponding roof side rail 5.

A side sill 8 that extends in the front-rear direction of the vehicle 1 and that has a closed cross section structure is disposed on the lower sides of the left and right side portions of the vehicle 1. A front portion and a rear portion of each of the left and right side sills 8 are coupled to the lower end of a corresponding one of the front pillars 6 and the lower end of a corresponding one of the rear pillar 7, respectively. The lower end of a center pillar 9 that extends in the top-bottom direction in such a manner as to connect a corresponding one of the side sills 8 and a corresponding one of the roof side rails 5 is coupled to a substantially central portion of the corresponding side sill 8 in the front-rear direction of the side sill 8.

Each of the front pillars 6 includes an inclined region 6A extending diagonally rearward and upward from the front end portion thereof toward the corresponding roof side rail 5 and a downwardly extending region 6B extending downward in a substantially vertical direction from the front end portion of the inclined region 6A. Since the inclined region 6A of each of the front pillars 6 is a portion that is to be disposed in a boundary portion between a front window glass (not illustrated) that is disposed in front of the vehicle cabin 2 and one of front side doors (not illustrated), the width of each of the inclined regions 6A is small when viewed from the sides of the vehicle 1, and the cross section of each of the inclined regions 6A in a direction perpendicular to a direction in which the inclined regions 6A extend is relatively small. In contrast, since the downwardly extending region 6B of each of the front pillars 6 is a portion that is to be disposed on one of the sides of the front portion of the vehicle cabin 2 in such a manner as to support the corresponding front side door, the width of each of the downwardly extending regions 6B is large in the front-rear direction when viewed from the sides of the vehicle 1, and the cross section of each of the downwardly extending regions 6B in a direction perpendicular to a direction in which the downwardly extending regions 6B extend is relatively large.

Figure 2:
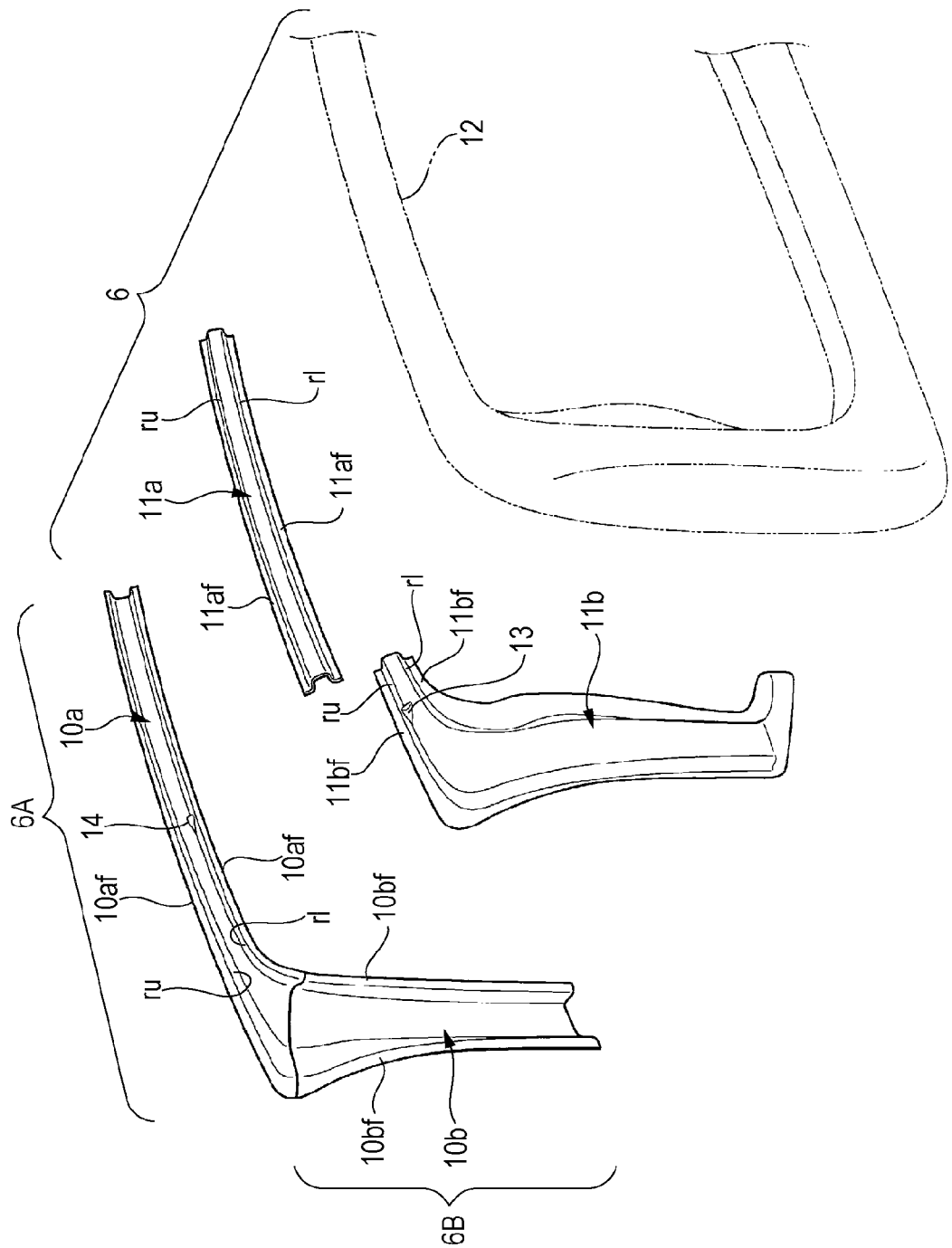
FIG. 2 is an exploded perspective view illustrating components of a side portion of a vehicle body of a vehicle according to the first embodiment of the present disclosure.
Figure 4:
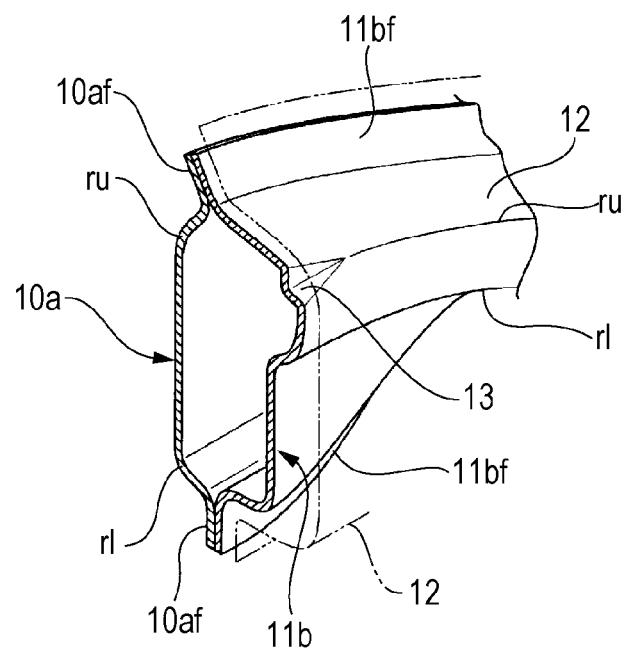
FIG. 4 is a cross-sectional view of the vehicle according to the first embodiment of the present disclosure taken along line IV-IV of FIG. 1.
Figure 5:
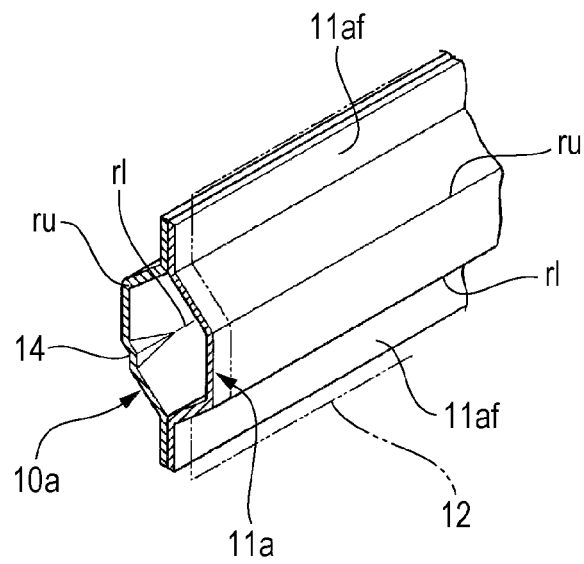
FIG. 5 is a cross-sectional view of the vehicle according to the first embodiment of the present disclosure taken along line V-V of FIG. 1.

FIG. 2 is a diagram illustrating main components of one of the front pillars 6. FIG. 4 and FIG. 5, respectively are a cross-sectional view of the front pillar 6 taken along line IV-IV of FIG. 1 and a cross-sectional view of the front pillar 6 taken along line V-V of FIG. 1.

As illustrated in these drawings, inner panels 10a and 10b each of which has a hat-shaped cross section, an upper stiffener 11a (a reinforcing member) that also has a hat-shaped cross section, and a lower stiffener 11b are coupled to one another at their flange portions, so that the front pillar 6 has a closed cross section structure. Note that an outer panel 12 that integrally covers substantially the entire area of one side of the vehicle body except for one side of the engine compartment 3 is to be joined to the outer sides of the upper stiffener 11a and the lower stiffener 11b in a vehicle width direction. Note that the outer panel 12 is not illustrated in FIG. 1. The inner panels 10a and 10b of the front pillar 6 also form a closed cross section together with the outer panel 12, and the upper stiffener 11a and the lower stiffener 11b are disposed in the closed cross section in such a manner as to reinforce the closed cross section.

In the front pillar 6, a flange portion 11bf formed in an upper portion of the lower stiffener 11b and a flange portion 11af of the upper stiffener 11a extending over the length of the upper stiffener 11a in the longitudinal direction are joined to a flange portion 10af of the inner panel 10a, so that the continuous closed cross section of the inclined region 6A that functions as a frame of the vehicle body is formed.

An upper end portion of the lower stiffener 11b is bent diagonally upward toward the rear side of the vehicle body, and the bent portion forms a part of the front end portion of the inclined region 6A. The bent portion of the lower stiffener 11b and the upper stiffener 11a form a substantially continuous hat-shaped cross section while there is a portion in which the bent portion of the lower stiffener 11b and the upper stiffener 11a are superposed with each other. Therefore, in the inclined region 6A, the inner panel 10a, the bent portion of the lower stiffener 11b, and the upper stiffener 11a form a closed cross section that continues in the longitudinal direction.

As illustrated in FIG. 4 and FIG. 5, an upper ridge line ru and a lower ridge line rl each of which extends in the longitudinal direction are formed in the bent portion of the lower stiffener 11b and the upper stiffener 11a. The upper ridge line ru and the lower ridge line rl protrude outward in the vehicle width direction.

As illustrated in FIG. 4, a first fragile portion 13 that is partly recessed toward the inside of the vehicle cabin 2 is formed in the upper ridge line ru that is formed in the bent portion of the lower stiffener 11b. The first fragile portion 13 forms an inward-deformation-inducing portion that induces bending deformation of the inclined region 6A toward the inside of the vehicle cabin 2 when a load is input from the front end portion of the front pillar 6 along the longitudinal direction of the inclined region 6A. The first fragile portion 13 becomes a bending starting point of bending deformation toward the inside of the vehicle cabin 2 (an inward and diagonally downward bending deformation in the vehicle width direction) when a load is input from the front end portion of the front pillar 6.

Similarly, the upper ridge line ru and the lower ridge line rl each of which extends in the longitudinal direction are formed in the inner panel 10a. The upper ridge line ru and the lower ridge line rl in the inner panel 10a protrude inward in the vehicle width direction.

As illustrated in FIG. 5, a second fragile portion 14 that is partly recessed toward an area outside the vehicle cabin 2 is formed in the lower ridge line rl that is formed on the inner panel 10a. The second fragile portion 14 forms an outward-deformation-inducing portion that induces bending deformation of the inclined region 6A toward the area outside the vehicle cabin 2 (an outward and diagonally upward bending deformation of the inclined region 6A in the vehicle width direction) when a load is input from the front end portion of the front pillar 6 along the longitudinal direction of the inclined region 6A.

The first fragile portion 13 that is formed in the bent portion of the lower stiffener 11b is formed in the vicinity of the front end portion of the inclined region 6A of the front pillar 6. The second fragile portion 14 that is formed in the inner panel 10a is formed at a position in the inclined region 6A of the front pillar 6 that is spaced rearward away from the first fragile portion 13 by a predetermined distance. Therefore, the first fragile portion 13, which is the inward-deformation-inducing portion, is formed in front of the second fragile portion 14, which is the outward-deformation-inducing portion.

As will be described in detail later, the second fragile portion 14 becomes a bending starting point of outward bending deformation with respect to the vehicle width direction when an impact load is input from the front portion of the front pillar 6. The position of the second fragile portion 14 in the inclined region 6A of the front pillar 6 is set to be in front of the position of the head of an occupant sitting on a front seat when the head is swung forward to the maximum extent and also set to be lower than the height of the head.

In the front pillar 6 according to the first embodiment, the inclined region 6A is bent and deformed in two stages, that is, the inclined region 6A is bent and deformed at the first fragile portion 13 first and then at the second fragile portion 14, when an impact load is input from the front portion of the front pillar 6, and thus, a large stress or moment is not likely to be generated in a region behind the second fragile portion 14 of the inclined region 6A.

Although details of the roof side rail 5 that is continuous with the inclined region 6A of the front pillar 6 are not illustrated, in the roof side rail 5, an inner panel and the outer panel 12 are joined to each other as in the case of the front pillar 6, so that a closed cross section that is continuous with the front pillar 6 is formed. In the closed cross section formed by the inner panel and the outer panel 12, a stiffener that is a reinforcing member is interposed between the inner panel and the outer panel 12. The stiffener is disposed in a region extending from a front end portion of the roof side rail 5 at least to a joint portion of the roof side rail 5 to which the center pillar 9 is joined.

Therefore, bending deformation is not likely to occur in a region extending from the second fragile portion 14 in the front pillar 6 to the joint portion of the roof side rail 5, to which the center pillar 9 is joined, even in the case where a large impact load is input from the front portion of the front pillar 6.

As illustrated in FIG. 1, a side-curtain air bag system 15 is mounted on an inner surface of the vehicle cabin 2 in the region extending from the second fragile portion 14 in the front pillar 6 to the joint portion of the roof side rail 5, to which the center pillar 9 are joined.

Figure 3:
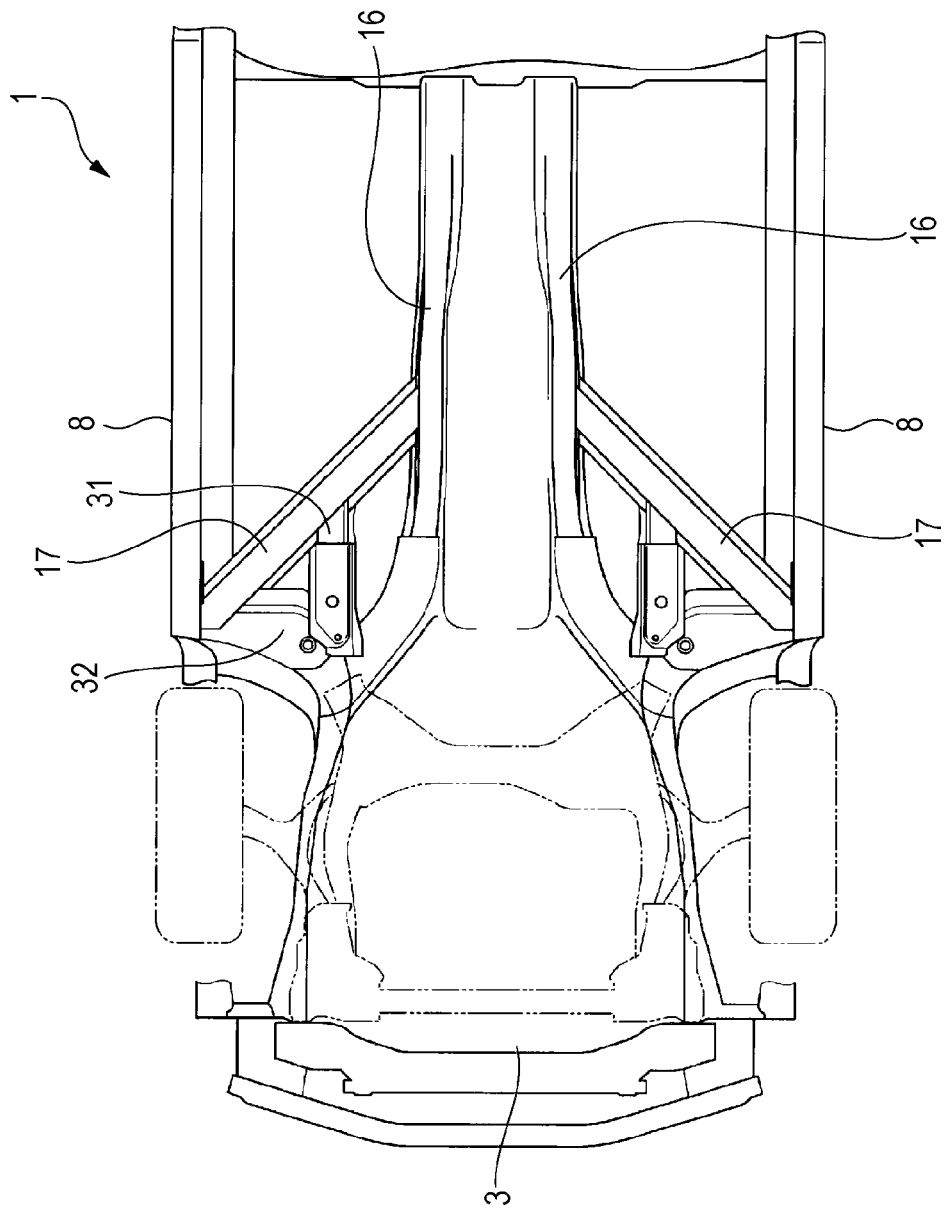
FIG. 3 is a bottom view of the vehicle according to the first embodiment of the present disclosure.
Figure 6:
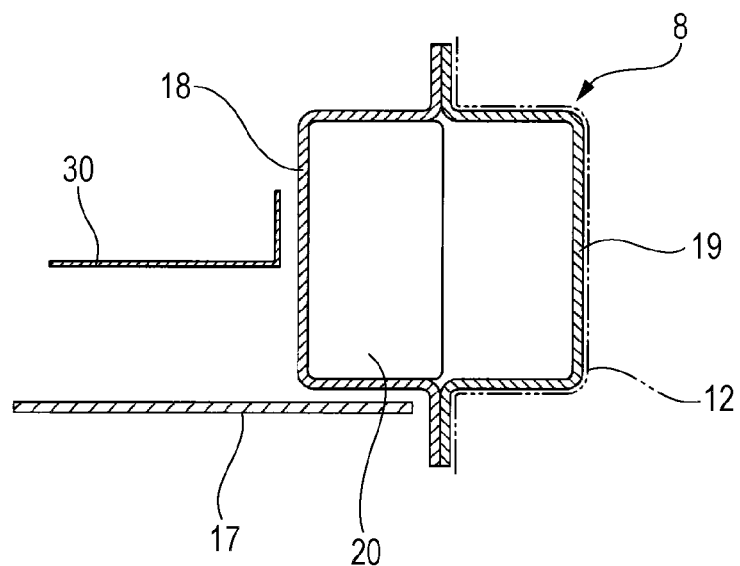
FIG. 6 is a cross-sectional view of the vehicle according to the first embodiment of the present disclosure taken along line VI-VI of FIG. 1.

FIG. 3 is a diagram illustrating the supporting structure of the front end portions of the side sills 8, which are disposed on the left and right sides of the vehicle body, on the bottom surface side of the vehicle body. FIG. 6 is a cross-sectional view taken along line VI-VI of FIG. 1.

As illustrated in FIG. 3, a pair of tunnel frames 16 that are frame members extending in the front-rear direction of the vehicle body are disposed in an inner region in the vehicle width direction that is located under the vehicle cabin 2. A diagonal frame 17 is formed between each of the left and right tunnel frames 16 and a corresponding one of the left and right side sills 8. Each of the diagonal frames 17 extends diagonally forward from a side of the corresponding tunnel frame 16 and connects the tunnel frame 16 and the front end portion of the corresponding side sill 8. In order to receive an impact load input to a front side frame by transferring the impact load onto the diagonal frames 17, and in order to control bending deformation of the diagonal frames 17, a portion of each of the diagonal frames 17 at a position substantially halfway along the diagonal frame 17 in the extending direction of the diagonal frame 17 is connected to an outrigger 32 that is a strength member extending in the vehicle width direction via an auxiliary frame 31. Note that a reference numeral 30 in FIG. 6 denotes a floor panel that is to be disposed at the lower portion of the vehicle cabin 2.

As illustrated in FIG. 1, the lower end of the downwardly extending region 6B of one of the front pillars 6 is coupled to the upper side of the front portion of a corresponding one of the side sills 8 above a coupling portion to which the corresponding diagonal frame 17 is coupled.

In each of the side sills 8, as illustrated in FIG. 6, a stiffener 19 that has a hat-shaped cross section and that is a reinforcing member is connected to an inner panel 18 that also has a hat-shaped cross section, so that a closed cross section is formed. The outer panel 12 is joined to the outer side of the stiffener 19, and the inner panel 18 also forms a closed cross section together with the outer panel 12.

A bulk head 20 (a partition wall member) that reinforces the closed cross section formed by the outer panel 12 and the inner panel 18 is disposed at a position in each of the side sills 8 below a coupling portion to which the lower end of the downwardly extending region 6B of the corresponding front pillar 6 is coupled.

Figure 7:
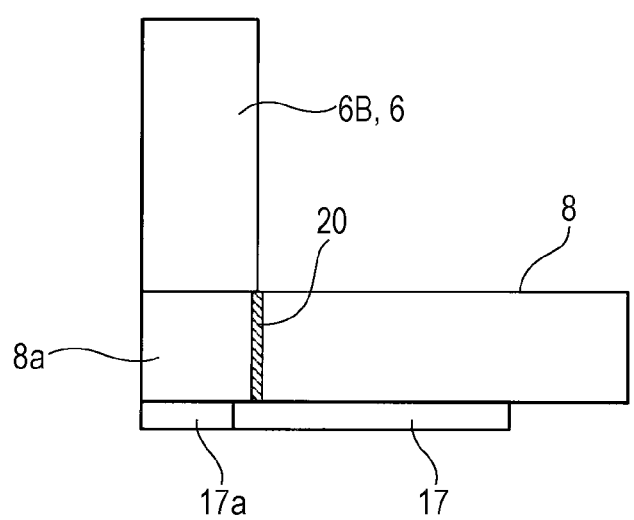
FIG. 7 is a schematic side view illustrating a connecting portion of a front pillar according to the first embodiment of the present disclosure that is connected to a side sill.

FIG. 7 is a diagram schematically illustrating joint states of one of the front pillars 6 and one of the diagonal frames 17 with respect to the front end portion of the corresponding side sill 8 and the arrangement of a corresponding one of the bulk heads 20 in the side sill 8.

To be exact, as illustrated in FIG. 1 and FIG. 7, the bulk head 20 is disposed at a position in the side sill 8 right below a rear end portion of the lower end of the downwardly extending region 6B of the front pillar 6. In addition, the bulk head 20 is mounted in such a manner as to be in contact with the U-shaped inner wall of the inner panel 18 in the side sill 8 at the upper and lower portions.

In the first embodiment, a region of the front portion of each of the side sills 8 in front of the corresponding bulk head 20 is a fragile portion 8a, and a region of the front end portion of the corresponding diagonal frame 17 that is joined to the lower side of the region of the front portion of the side sill 8 is a fragile portion 17a. Buckling is likely to occur in the fragile portions 8a and 17a when a load is diagonally input from the front. The fragile portions 8a and 17a may be formed by, for example, forming a recess or a cutout portion or by reducing the thicknesses of the side sill 8 and the diagonal frame 17.

Figure 8:
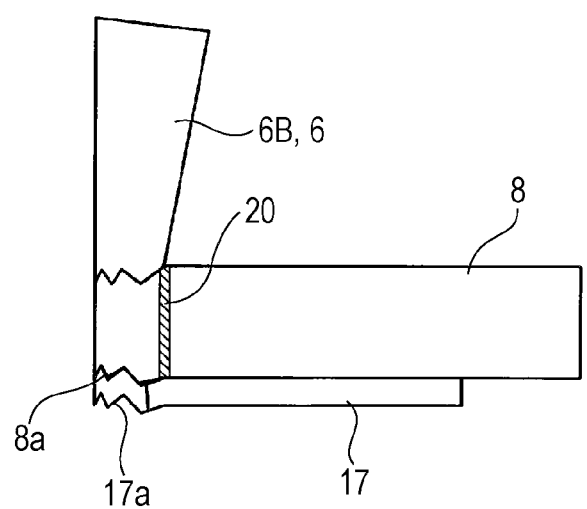
FIG. 8 is a schematic side view illustrating the connecting portion of the front pillar according to the first embodiment of the present disclosure, which is connected to the side sill.
Figure 9:
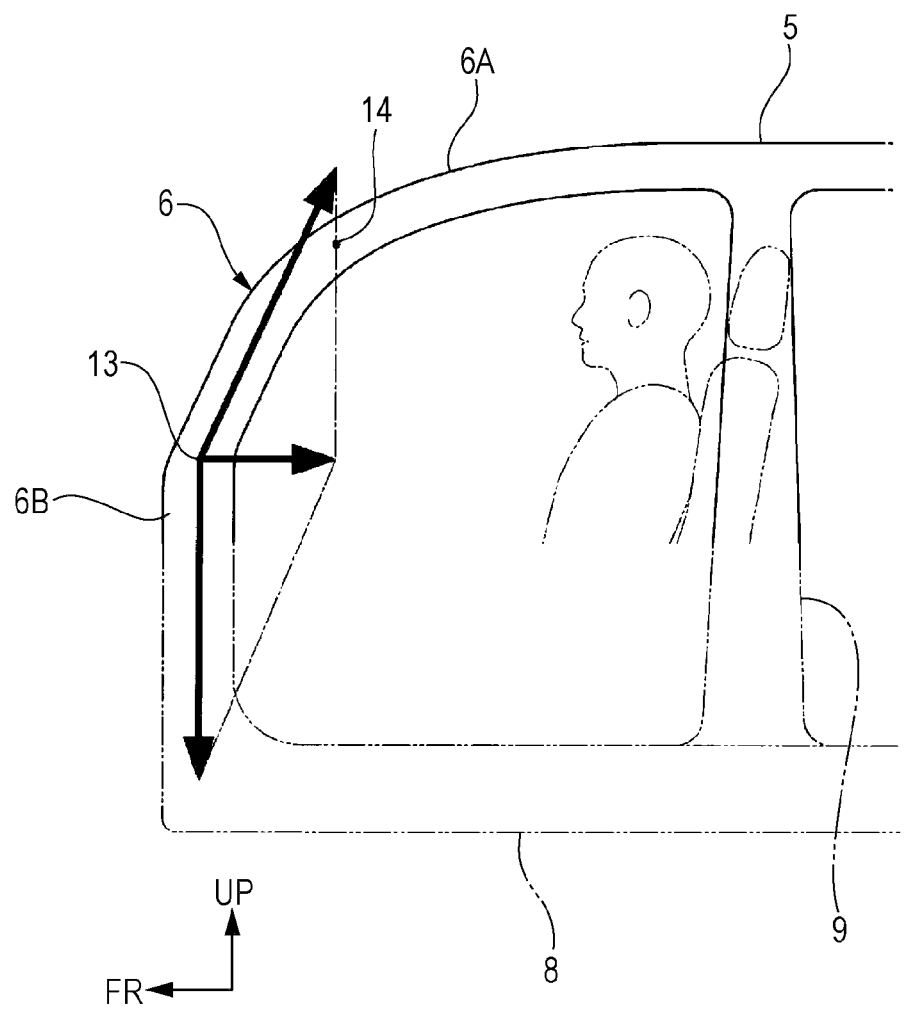
FIG. 9 is a schematic side view of the vehicle employing the vehicle body side structure according to the first embodiment of the present disclosure.

FIG. 8 is a diagram illustrating the deformation behavior of the front end portions of one of the side sills 8 and the corresponding diagonal frame 17 when a large impact load is input to the downwardly extending region 6B of the corresponding front pillar 6 from an area outside and diagonally in front of the vehicle 1 with respect to the vehicle width direction, and FIG. 9 is a diagram illustrating a component of force of the load that is transferred onto the inclined region 6A of the front pillar 6 at that time.

As illustrated in FIG. 8, in the first embodiment, the fragile portion 8a and the fragile portion 17a are formed in the front end portions of the side sill 8 and the diagonal frame 17, respectively, and thus, when a large impact load is input to the downwardly extending region 6B of the front pillar 6 from an area outside and diagonally in front of the vehicle 1 with respect to the vehicle width direction, buckling deformation occurs in the front end portions of the side sill 8 and the diagonal frame 17 at the fragile portions 8a and 17a first, and the downwardly extending region 6B of the front pillar 6 is displaced toward the rear of the vehicle body while maintaining a substantially vertical posture.

Therefore, in the case of the vehicle 1 in which the inclined region 6A of each of the front pillars 6 has a sharp rising curve as illustrated in FIG. 9, a component of force of an impact load that acts on the inclined region 6A of each of the front pillars 6 along a direction in which the inclined region 6A extends may be increased.

Figure 10:
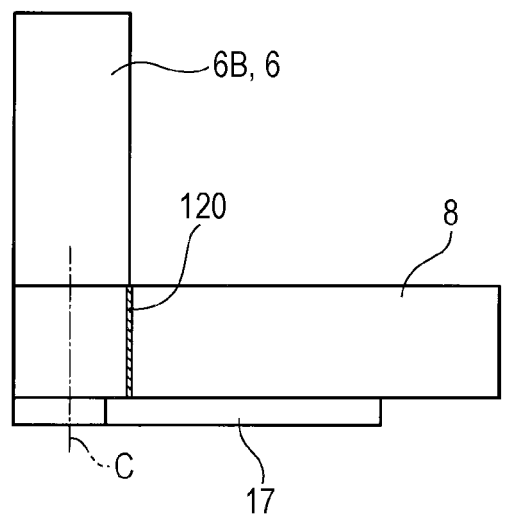
FIG. 10 is a schematic side view illustrating a connecting portion of a front pillar according to a second embodiment of the present disclosure that is connected to a side sill.
Figure 11:
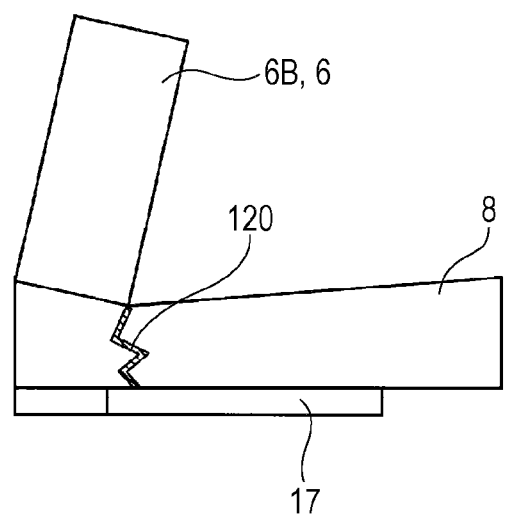
FIG. 11 is a schematic side view illustrating the connecting portion of the front pillar according to the second embodiment of the present disclosure, which is connected to the side sill.
Figure 12:
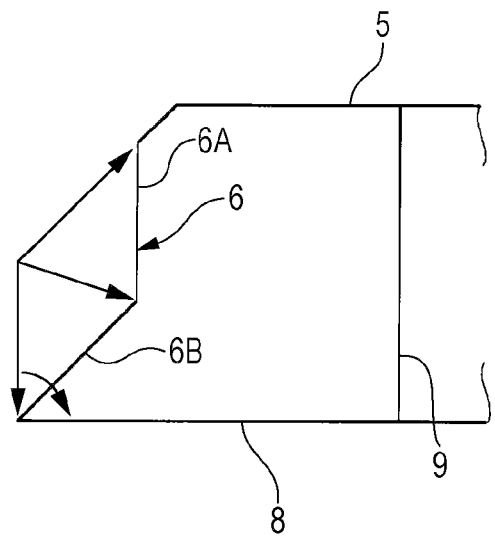
FIG. 12 is a schematic side view of a vehicle illustrating a vehicle body side structure according to the second embodiment of the present disclosure.

Note that in the case where the present disclosure is applied to a vehicle in which the inclined region 6A of each of the front pillars 6 has a gentle rising curve, a structure such as that illustrated in FIG. 10 to FIG. 12 may be employed.

In a second embodiment illustrated in FIG. 10 to FIG. 12, a fragile portion is formed in a portion of each of the side sills 8 that corresponds to the position of the rearmost end of the coupling portion of the side sill 8 to which the corresponding front pillar 6 is coupled instead of forming fragile portions in the front end portions of each of the side sills 8 and the corresponding diagonal frame 17. More specifically, the rigidity of a bulk head 120 (a partition wall member) that is to be disposed in the portion of each of the side sills 8 is set low.

In the second embodiment, when a large impact load is input to the downwardly extending region 6B of one of the front pillars 6 from an area outside and diagonally in front of the vehicle 1 with respect to the vehicle width direction, a corresponding one of the bulk heads 120 that supports the lower end of a rear portion of the downwardly extending region 6B of the front pillar 6 is crushed downward as illustrated in FIG. 11, and the downwardly extending region 6B of the front pillar 6 is likely to become inclined downward toward the rear.

Note that the fragile portion that is to be formed in each of the side sills 8 is not always limited to being formed in that portion, which corresponds to the position of the rearmost end of the coupling portion to which the corresponding front pillar 6 is coupled, as long as the fragile portion is formed behind the center c of the coupling portion, to which the corresponding front pillar 6 is coupled, in the front-rear direction.

FIG. 12 is a diagram illustrating a component of force of a load that is transferred onto the inclined region 6A of the front pillar 6 when the large impact load is input to the downwardly extending region 6B of one of the front pillars 6 from an area outside and diagonally in front of the vehicle with respect to the vehicle width direction. In the second embodiment, the downwardly extending region 6B of the front pillar 6 is inclined downward toward the rear during the early period when the impact load is input, and thus, as illustrated in FIG. 12, in the case of a vehicle in which the inclined region 6A of the front pillar 6 has a gentle rising curve, the component of force of the impact load that acts on the inclined region 6A of the front pillar 6 along the extending direction of the inclined region 6A may be increased.

The deformation behavior of the vehicle body when a large impact load is input to the front portion of one of the front pillars 6 of the vehicle 1 from an area outside and diagonally in front of the vehicle 1 with respect to the vehicle width direction will be described below.

Figure 13:
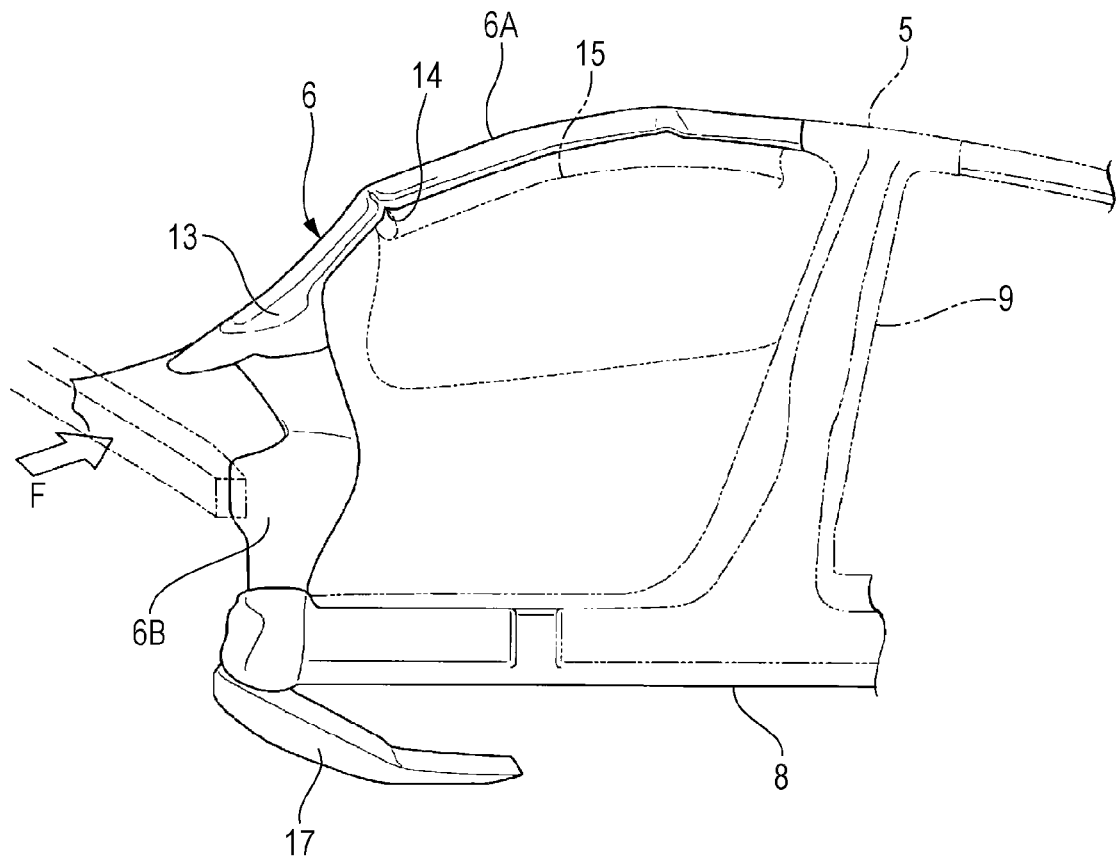
FIG. 13 is a schematic side view of the vehicle employing the vehicle body side structure according to the first embodiment of the present disclosure.
Figure 14:
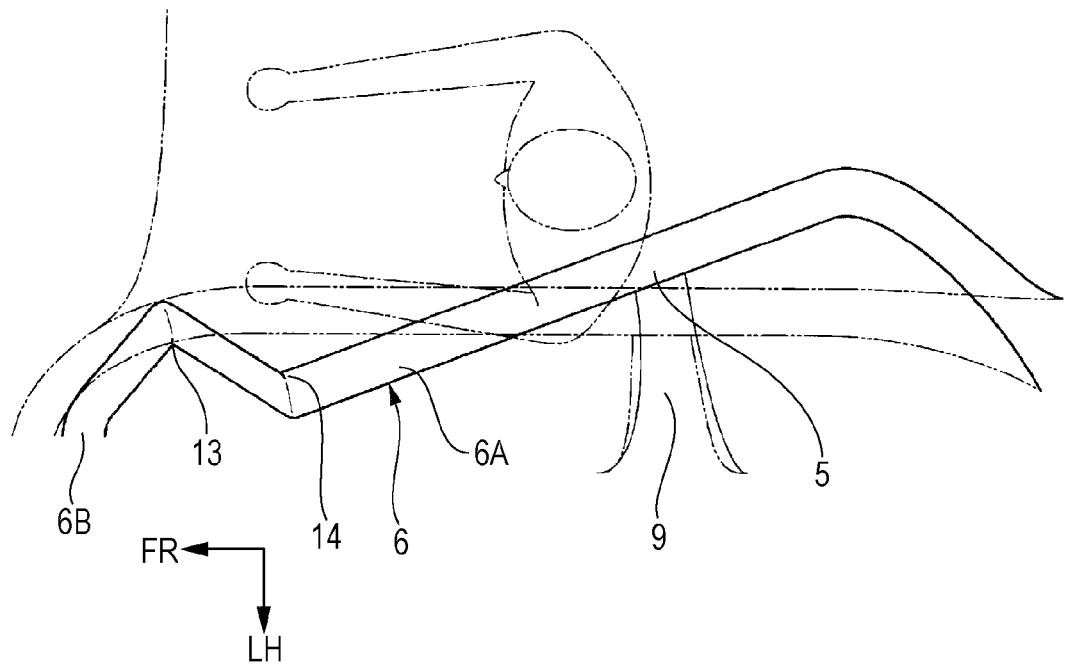
FIG. 14 is a top view of the vehicle employing the vehicle body side structure according to the first embodiment of the present disclosure.
Figure 15:
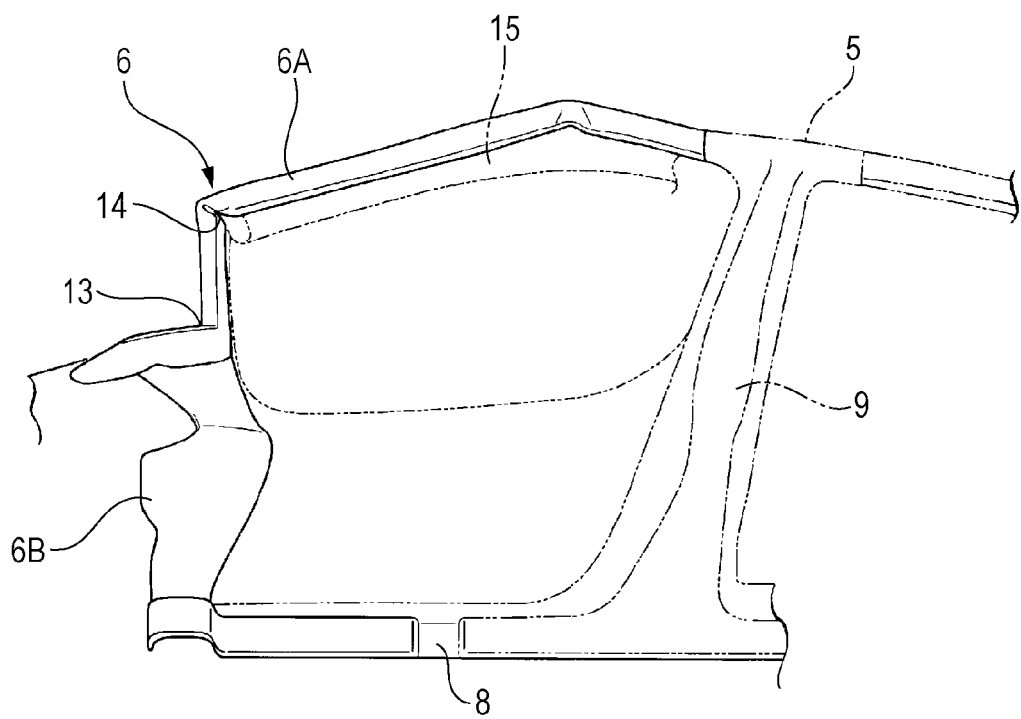
FIG. 15 is a schematic side view of the vehicle employing the vehicle body side structure according to the first embodiment of the present disclosure.

FIG. 13 is a diagram illustrating an early stage of deformation of the vehicle body, and FIG. 14 and FIG. 15 are diagrams illustrating a later stage of the deformation of the vehicle body.

As illustrated in FIG. 13, when a large impact load F is input to the front portion of one of the front pillars 6 from an area outside and diagonally in front of the vehicle 1 with respect to the vehicle width direction, a component of force of the impact load F is transferred onto the inclined region 6A of the front pillar 6 along the extending direction of the inclined region 6A. When the component of force is transferred to the inclined region 6A in this manner, a front portion of the inclined region 6A is bent and deformed toward the inside of the vehicle cabin 2 with the first fragile portion 13 acting as a deformation starting point, and a portion of the inclined region 6A behind the first fragile portion 13 is bent and deformed toward an area outside the vehicle cabin 2 with the second fragile portion 14 acting as a deformation starting point.

In this case, as illustrated in FIG. 14 and FIG. 15, a portion of the inclined region 6A in the vicinity of the first fragile portion 13 is bent and deformed to a large extent in a direction toward the inside of the vehicle cabin 2 in the later stage of the deformation of the vehicle body. However, the first fragile portion 13 is formed in front of the second fragile portion 14 in the inclined region 6A, and thus, the portion of the inclined region 6A in the vicinity of the first fragile portion 13 will not project into a portion in the vicinity of a front seat. On the other hand, a portion of the inclined region 6A in the vicinity of the second fragile portion 14 does not project into the inside of the vehicle cabin 2 even if the portion of the inclined region 6A in the vicinity of the second fragile portion 14 is bent and deformed to a large extent in the later stage of the deformation of the vehicle body.

In the vehicle body side structure according to the first embodiment, as described above, when the large impact load F is input to the front portion of one of the front pillars 6 from an area outside and diagonally in front of the vehicle 1 with respect to the vehicle width direction, the inclined region 6A is bent and deformed at two positions, which are the first fragile portion 13 and the second fragile portion 14, acting as starting points. Therefore, a large impact load is not likely to be transferred onto a portion of the inclined region 6A of the front pillar 6 behind the second fragile portion 14. As a result, in the vehicle body side structure, buckling in a direction toward the inside of the vehicle cabin 2 will not occur in a rear region of each of the front pillars 6 and each of the roof side rails 5 as a result of receiving a large stress, and the rear region of each of the front pillars 6 and each of the roof side rails 5 will not be significantly displaced as a result of receiving a large moment.

Therefore, in the vehicle body side structure, significant entry of the rear portions of the front pillars 6 and the roof side rails 5 in a direction toward the inside of the vehicle cabin 2 may be prevented from occurring when a large impact load is input without providing a significant reinforcement to the front pillars 6 and the roof side rails 5.

In the first embodiment, the first fragile portion 13 is formed in the upper ridge line ru of one of the lower stiffeners 11b that forms part of the closed cross section of the corresponding front pillar 6 and faces an area outside the vehicle cabin 2, and the second fragile portion 14 is formed in the lower ridge line rl of one of the inner panel 10a that forms part of the closed cross section of the corresponding front pillar 6 and faces the inside the vehicle cabin 2, so that the bending deformation of the inclined region 6A toward the inside of the vehicle cabin 2 and the bending deformation of the inclined region 6A toward the area outside the vehicle cabin 2 are controlled. Therefore, the bending direction of each of the inclined regions 6A may be controlled as desired with an extremely simple structure.

In the first embodiment, the region extending from the second fragile portion 14 in the inclined region 6A of each of the front pillars 6 to the joint portion of the corresponding roof side rail 5 to which the corresponding center pillar 9 is joined is continuously reinforced by a reinforcing member such as the upper stiffener 11a, and the side-curtain air bag system 15 is disposed in the region. Thus, occurrence of deformation in the region may be sufficiently suppressed when the large impact load is input from the front end side of the front pillar 6 along the corresponding inclined region 6A, and in addition, a space large enough for the side-curtain air bag system 15 to expand may be secured.

In the first embodiment, the front end of each of the diagonal frames 17, the rear end of which is coupled to the corresponding tunnel frame 16, is coupled to the front portion of the corresponding side sill 8 to which the lower end of the downwardly extending region 6B of the corresponding front pillar 6 is coupled, and the front end portions of the side sill 8 and the diagonal frame 17 function as fragile portions in each of which buckling is likely to occur when a load is input. Thus, when an impact load is diagonally input from the front, the downwardly extending region 6B of the front pillar 6 may be displaced rearward without the inclination angle thereof changing. Therefore, in the case where the present disclosure is applied to a vehicle in which the inclined region 6A of each of the front pillars 6 has a sharp rising curve, a component of force of an impact load that acts along one of the inclined regions 6A may be increased, and the inclined region 6A may be made to deform with certainty with the corresponding first fragile portion 13 and the corresponding second fragile portion 14 acting as starting points.

In the first embodiment, each of the side sills 8 having a closed cross section is reinforced with the corresponding stiffener 19, which is a reinforcing member, the front end of each of the diagonal frames 17, the rear end of which is coupled to the corresponding tunnel frame 16, is coupled to the front portion of the corresponding side sill 8, and the bulk head 20 is disposed within each of the side sills 8 at a position below and in the vicinity of the coupling portion of the side sill 8 to which the downwardly extending region 6B of the corresponding front pillar 6 is coupled. Because of these, occurrence of excessive bending of each of the side sills 8 may be suppressed. Therefore, when an impact load is diagonally input from the front, a component of force may be made to effectively act in a direction along the inclined region 6A of one of the front pillars 6.

In the second embodiment illustrated in FIG. 10 to FIG. 12, the front end of each of the diagonal frames 17, the rear end of which is coupled to the corresponding tunnel frame 16, is coupled to the front portion of the corresponding side sill 8 to which the lower end of the downwardly extending region 6B of the corresponding front pillars 6 is coupled, and the bulk head 120 having a fragile structure is disposed in a portion of each of the side sills 8 that corresponds to the position of the rearmost end of the coupling portion of the side sill 8 to which the corresponding front pillar 6 is coupled. Thus, when an impact load is diagonally input from the front, the downwardly extending region 6B of each of the front pillars 6 may be displaced rearward by making the downwardly extending region 6B to be inclined downward toward the rear. Therefore, in the case where the present disclosure is applied to a vehicle in which the inclined region 6A of each of the front pillars 6 has a gentle rising curve, a component of force of an impact load that acts along one of the inclined regions 6A may be increased, and the inclined region 6A may be made to deform with certainty with the corresponding first fragile portion 13 and the corresponding second fragile portion 14 acting as starting points.

Note that the present disclosure is not limited to the above embodiments, and various design changes may be made within the gist of the present disclosure.

We claim:

1. A vehicle body side structure comprising:
   a front pillar including an inclined portion extending diagonally rearward and upward from a front end portion of the front pillar,
   wherein the front pillar further includes:
   a first fragile portion disposed in the inclined portion to induce bending deformation of the front pillar inwardly of a vehicle cabin when a load is input from a front of the front pillar, and
   a second fragile portion disposed in the inclined portion to induce bending deformation of the front pillar outwardly of the vehicle cabin when the load is input from the front of the front pillar,
   wherein the first fragile portion is positioned in front of the second fragile portion, and
   wherein the inclined portion is positioned at a border between a front windshield glass and a front side door.

2. The vehicle body side structure according to claim 1, further comprising a roof side rail provided, at a rear of the front pillar, continuously with a rear portion of the front pillar, the roof side rail being connected to a center pillar,
   wherein the vehicle body side structure includes, in a region extending at least from the second fragile portion of the front pillar to a portion of the roof side rail at which the roof side rail is connected to the center pillar, an outer panel and an inner panel connected to the outer panel such that the outer panel and the inner panel form a closed cross section, and a reinforcing member disposed in the closed cross section, and
   wherein the vehicle body side structure further includes a side-curtain air bag system disposed in the region.

3. The vehicle body side structure according to claim 1,
   wherein the front pillar includes an inner panel and a reinforcing member disposed on an outer side of the inner panel and connected to the inner panel such that the inner panel and the reinforcing member form a closed cross section,
   wherein the reinforcing member includes an upper ridge and a lower ridge, each extending along a longitudinal direction of the front pillar, and
   wherein the first fragile portion is provided on the upper ridge.

4. The vehicle body side structure according to claim 1,
   wherein the front pillar includes an inner panel and a reinforcing member disposed on an outer side of the inner panel and connected to the inner panel such that the inner panel and the reinforcing member form a closed cross section,
   wherein the inner panel includes an upper ridge and a lower ridge, each extending along a longitudinal direction of the front pillar, and
   wherein the second fragile portion is provided on the lower ridge.

5. The vehicle body side structure according to claim 1,
   wherein the front pillar includes a downwardly extending portion extending downward from a front end portion of the inclined portion,
   wherein the vehicle body side structure further includes a side sill disposed on a lower side of the vehicle body and extending in a longitudinal direction of the vehicle body, and a diagonal frame diagonally extending from a front of a side portion of a vehicle body toward an inner side of the vehicle body, connected to a frame member disposed on the inner side of the vehicle body at one end thereof, and connected to a front portion of the side sill at an opposite end,
   wherein a lower end of the downwardly extending portion of the front pillar is connected to a front end portion of the side sill, and
   wherein a third fragile portion is disposed in the front end portion of the side sill and a front end portion of the diagonal frame, the third fragile portion being buckled when a load is diagonally input from the front of the side portion of the vehicle body.

6. The vehicle body side structure according to claim 1,
   wherein the front pillar includes a downwardly extending portion extending downward from a front end portion of the inclined portion,
   wherein the vehicle body side structure further includes a side sill disposed on a lower side of the vehicle body and extending in a longitudinal direction of the vehicle body, and a diagonal frame diagonally extending from a front of a side portion of a vehicle body toward an inner side of the vehicle body, connected to a frame member disposed on the inner side of the vehicle body at one end thereof, and connected to a front portion of the side sill at an opposite end,
   wherein a lower end of the downwardly extending portion of the front pillar is connected to the front end portion of the side sill at a connection portion, and
   wherein a third fragile portion is disposed in a portion of the side sill behind the center of the connection portion in the vehicle longitudinal direction, the third fragile portion being buckled when a load is diagonally input from the front of the side portion of the vehicle body.

7. The vehicle body side structure according to claim 1,
   wherein the front pillar includes a downwardly extending portion extending downward from a front end portion of the inclined portion,
   wherein the vehicle body side structure further includes a side sill disposed on a lower side of the vehicle body and extending in a longitudinal direction of the vehicle body,
   wherein the side sill includes an outer panel and an inner panel connected to the outer panel such that the outer panel and the inner panel form a closed cross section, and includes a reinforcing member disposed in the closed section, wherein the vehicle body side structure further includes a diagonal frame diagonally extending from a front of the side portion of the vehicle body toward an inner side of the vehicle body, connected to a frame member disposed on the inner side of the vehicle body at one end thereof, and connected to the side sill at an opposite end, and wherein the side sill includes a partition wall member reinforcing the cross section of the side sill at a position below and in a vicinity of a connection portion connecting the side sill to the downwardly extending portion.

8. A vehicle body side structure comprising:

a front pillar including an inclined portion extending diagonally rearward and upward from a front end portion of the front pillar toward a roof side rail, and a downwardly extending portion extending downward from a front end portion of the inclined portion, wherein the front pillar includes an inner panel and a reinforcing member disposed on an outer side of the inner panel and connected to the inner panel such that the inner panel and the reinforcing member form a closed cross section, and the inclined portion is positioned at a border between a front windshield glass and a front side door, wherein the front pillar further includes:

a first fragile portion disposed in the inclined portion to induce bending deformation of the front pillar inwardly of a vehicle cabin when a load is input from a front of the front pillar, and a second fragile portion disposed in the inclined portion to induce bending deformation of the front pillar outwardly of the vehicle cabin when the load is input from the front of the front pillar, the first fragile portion being positioned in front of the second fragile portion, wherein the reinforcing member includes a first upper ridge and a first lower ridge, each extending along a longitudinal direction of the front pillar, and the first fragile portion is provided on the first upper ridge, and wherein the inner panel includes a second upper ridge and a second lower ridge, each extending along a longitudinal direction of the front pillar, and the second fragile portion is provided on the second lower ridge.

* * * * *